United States Patent
Sazegari

(10) Patent No.: US 6,446,198 B1
(45) Date of Patent: Sep. 3, 2002

(54) VECTORIZED TABLE LOOKUP

(75) Inventor: Ali Sazegari, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/409,669

(22) Filed: Sep. 30, 1999

(51) Int. Cl.$^7$ .............................................. G06F 9/315
(52) U.S. Cl. ..................................................... 712/300
(58) Field of Search ..................................... 712/7, 300

(56) References Cited

U.S. PATENT DOCUMENTS 6,223,320 B1 * 4/2001 Dubey et al. ............... 714/757
6,327,651 B1 * 12/2001 Dubey et al. ............... 712/300

FOREIGN PATENT DOCUMENTS

WO    WO 97/07451    * 2/1997

* cited by examiner

Primary Examiner—Kenneth S. Kim

(74) Attorney, Agent, or Firm—Burns Doane Swecker & Mathis, L.L.P.

(57) ABSTRACT

A lookup operation is carried out on a data table by logically dividing the data table into a number of smaller sets of data that can be indexed with a single byte of data. Each set of data consists of two vectors, which constitute the operands for a permute instruction. Only a limited number of bits are required to index into the table during the execution of this instruction. The remaining bits of each index are used as masks into a series of select instructions. The select instruction chooses between two vector components, based on the mask, and places the selected components into a new vector. The mask is generated by shifting one of the higher order bits of the index to the most significant position, and then propagating that bit throughout a byte, for example by means of an arithmetic shift. This procedure is carried out for all of the index bytes in the vector, to generate a select mask. The select mask is then used during a select operation, to choose between the results of permute instructions on different ones of the logically divided sets of data. Multi-byte table entries are retrieved by replicating each index value and adding consecutive values to form multiple consecutive index values that are then used in multiple permute operations.

31 Claims, 5 Drawing Sheets

| 1 | 0 | 0 | 0 | 1 | 0 | 0 | 0 | *Fig. 8a*

| 1 | 1 | 0 | 0 | 0 | 1 | 0 | 0 | *Fig. 8b*

| 1 | 1 | 1 | 0 | 0 | 0 | 1 | 0 | *Fig. 8c*

| 1 | 1 | 1 | 1 | 0 | 0 | 0 | 1 | *Fig. 8d*

| 1 | 1 | 1 | 1 | 1 | 0 | 0 | 0 | *Fig. 8e*

| 1 | 1 | 1 | 1 | 1 | 1 | 0 | 0 | *Fig. 8f*

| 1 | 1 | 1 | 1 | 1 | 1 | 1 | 0 | *Fig. 8g*

| 1 | 1 | 1 | 1 | 1 | 1 | 1 | 1 | *Fig. 8h*

| 11111111 | 11111111 | 00000000 | 11111111 | ... | *Fig. 9*

VECTORIZED TABLE LOOKUP

FIELD OF THE INVENTION

The present invention is generally directed to methods by which data is retrieved from tables in the operation of a computer, and more particularly to a vectorized table lookup method which is not restricted to tables of a relatively small size.

BACKGROUND OF THE INVENTION

Lookup tables are employed in the field of computer programming as a convenient mechanism to handle various types of data. Color lookup tables are one good example of the use of this programming technique. For example, a graphics program may employ 8-bit data to represent colors. As a result, 256 different colors can be selected. Of course, the entire color spectrum comprises significantly more than 256 different colors, and shades of color. Accordingly, a lookup table can be used to associate a specific color, or shade, with each of the 256 different values that can be designated with an 8-bit word. Furthermore, multiple color tables can be set up with different sets of 256 colors, to thereby establish different color palettes that can be selected by the users.

In addition to color palettes, lookup tables are employed for a variety of different purposes, including sound processing, function approximation, and other types of digital signal processing. In many situations, entries are retrieved from lookup tables in a scalar fashion, i.e. one entry is retrieved with each lookup instruction. However, in a computer which has a vector-based processing architecture, it is possible to simultaneously perform a number of lookup operations with a single instruction. In one approach, a standard "permute" instruction is used for this purpose. The permute instruction functions to store values from two operands into a result vector in any desirable order. In its application to table lookups, the two operands comprise two vectors which constitute a table. In an architecture which employs 128-bit registers, for example, the permuted values from the table can be selectively loaded into a register of this size with one instruction, to store 16 bytes of data, which thereby permits 16 table lookup operations to be performed simultaneously.

While the ability to simultaneously perform multiple table lookups with the permute instruction significantly increases processing efficiency, the use of this technique has been limited to tables which contain no more than two registers worth of data. Thus, in the case where the data registers are 128 bits (16 bytes) in length, for example, the maximum table size is 32 byte entries. For larger tables, it is not possible to utilize the permute operation for perform vector execution, and therefore table lookup operations are carried out in the conventional scalar form.

The need to resort to a scalar lookup operation decreases processing efficiency, for a number of reasons. First, each entry to be retrieved from the table requires a separate instruction, and consequently a greater number of processing cycles are necessary to obtain the data. Secondly, scalar operations and vector operations are typically carried out in separate processing units. If it becomes necessary to halt vector processing to perform a scalar lookup operation, the vector processor must store the table index values in a shared memory location, from which they are retrieved by the scalar processor. Similarly, once the scalar processor has obtained the table entries, they must be placed in the memory in order to return them to the vector processor. The need to write data into and read data from a shared memory location consumes additional time that leads to further processing inefficiencies. Hence, once processing begins in the vector domain, it is desirable to remain in that domain for as long as possible, rather than alternate between vector and scalar operations.

Accordingly, it is desirable to provide a method for table lookups in a vectorized manner which is not so limited in the size of the table that can be addressed. Such a method can result in significantly increased processing speed when multiple table lookup operations are involved, thereby avoiding the need to switch to a scalar processor when larger tables are encountered.

SUMMARY OF THE INVENTION

In accordance with the invention, this objective is achieved by logically dividing a large table into a number of smaller tables that can be uniquely indexed with a permute instruction. For instance, a 256-byte table can be logically divided into eight 32-byte tables. Each smaller table consists of two data vectors, which constitute the operands for the permute instruction. Only a limited number of bits in the permute instruction vector are required to index into the table during execution, e.g. five bits in the case of a 32-byte table. The remaining bits of each index are used as masks into a series of select instructions. The mask is generated by shifting one of the higher order bits of the index to the most significant position, and then propagating that bit throughout a byte, for example by means of an arithmetic shift. This procedure is carried out for all of the index bytes in the permute instruction vector, to generate a select mask. The select mask is then used during a select operation, to choose between the results of permute instructions on different ones of the logically divided tables.

By means of this approach, unused bits of each permute instruction byte are employed to expand the size of a table that can be addressed with multiple lookup operations simultaneously. For example, procedures which were previously limited to 32-byte tables can be employed in connection with lookup operations on 64-byte, 128-byte and 256-byte entry tables, through use of the three most significant bits in a vector byte.

As a further feature of the invention, the bytes in an index vector are expanded to create multiple consecutive indices, to permit multi-byte entries to be retrieved from tables. By means of this feature, it becomes possible to use the permute instruction to retrieve table entries that have lengths of a full word (4 bytes) or a half-word (2 bytes).

These and other features of the invention, as well as the advantages offered thereby, are explained in detail hereinafter, with reference to exemplary embodiments illustrated in the accompanying drawings.

BRIEF DESCRIPTION OF THE DRAWINGS

FIGS. 8a, 8b, 8c, 8d, 8e, 8f, 8g, and 8h illustrate the steps of an arithmetic shift right to propagate a bit throughout a byte;

FIG. 9 illustrates an example of a selection mask;

DETAILED DESCRIPTION

The present invention is generally directed to table lookup operations performed in computers which employ a vector-based processing architecture. One example of such a computer is a Single Instruction Multiple Data (SIMD) machine, such as the AltiVec processor manufactured by Motorola, Inc. To facilitate an understanding of the invention, exemplary embodiments will be described hereinafter with reference to the architecture employed in such a processor. However, it will be appreciated that the principles which underlie the invention are not limited to this particular environment. Rather, the invention can be implemented in any type of vectorized computing platform where it is desirable to perform a table lookup on relatively large tables.

Figure 1:
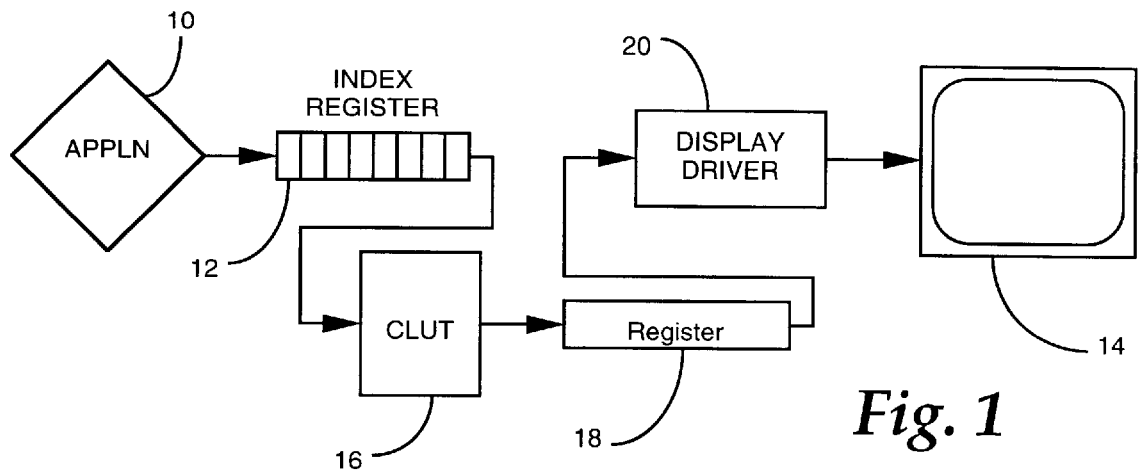
FIG. 1 is a schematic illustration in block form of a scalar table lookup operation.

A table lookup operation can be carried out in a scalar fashion or, in appropriate environments, a vectorized fashion. An example of a scalar lookup operation is depicted in FIG. 1. During execution, a computer program 10 generates an index value that is stored in a register 12 of the computer's central processing unit (CPU). For instance, in the operation of a graphics program, the index value may specify a color to be displayed on a monitor 14. An 8-bit index value can be used to specify one of 256 different colors. However, more than eight bits of data may be necessary to uniquely identify the color, for printing or display purposes. For example, in a color monitor, each of the red, green and blue components of the color may need to be specified by a separate 8-bit value, thereby requiring a total of 24 bits. In addition, the color may have an associated alpha value, or transparency factor, which is also expressed in 8 bits. Hence, a total of 32 bits of data is required to specify the particular color to be displayed by the monitor. In this case, a color lookup table 16 is employed. This table may be stored in the random access memory (RAM) of the computer. The 8-bit index value in the register 12 specifies one of 256 different entries within the lookup table. The particular entry which corresponds to the index value is read out of the table and stored in a register 18, where it is forwarded to a display driver 20 within the computer's operating system, to generate the appropriate display on the monitor 14.

Figure 2:
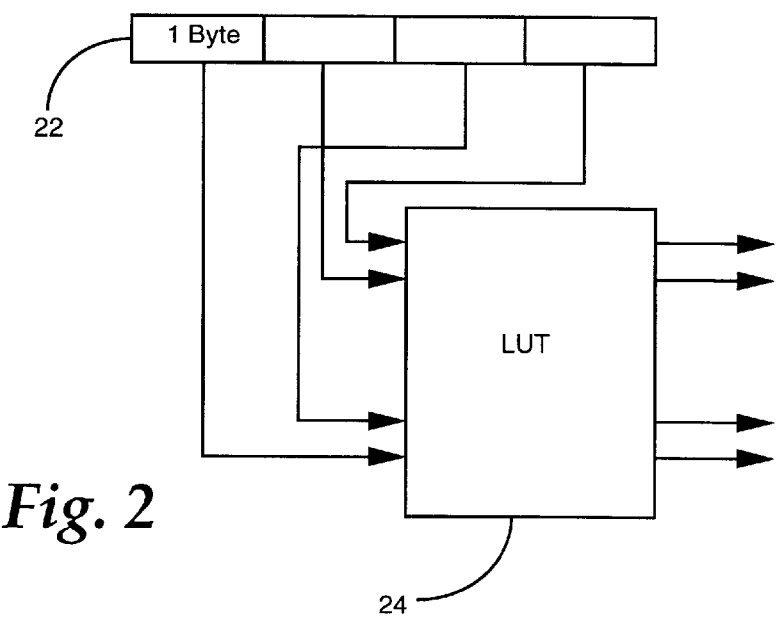
FIG. 2 is a schematic illustration in block form of a vectorized table lookup operation.

In a vectorized processing computer, it is possible to employ a larger data value for indexing purposes, so that a number of lookup operations can be carried out simultaneously. For instance, as depicted in FIG. 2, the value stored in a 32-bit register 22 can be employed to simultaneously execute four table lookup operations on a table 24. When vectorized processing is capable of being carried out, it can be seen that performance speed is significantly increased.

Figure 3:
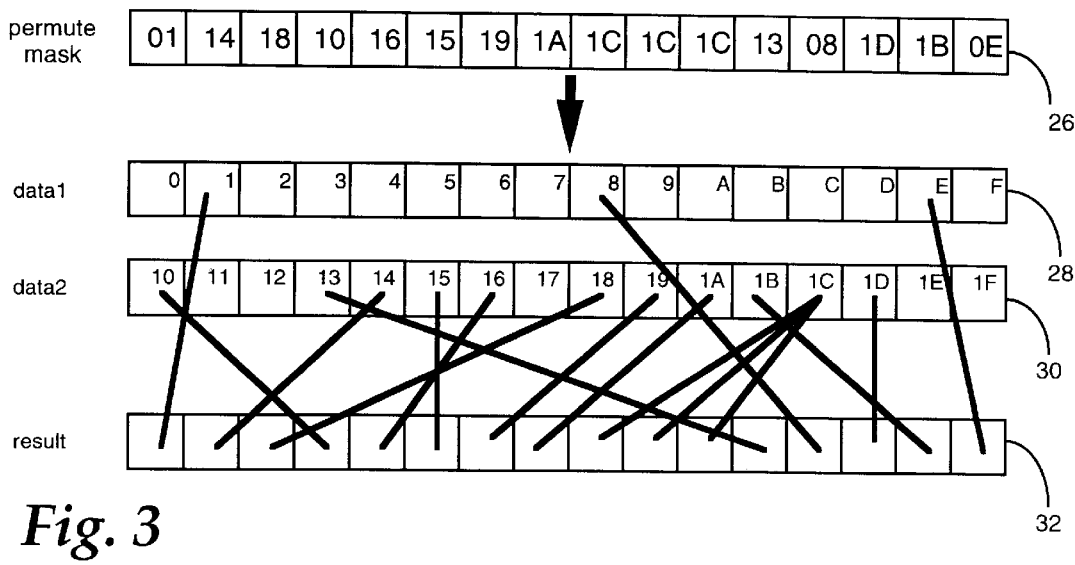
FIG. 3 is a functional representation of the permute instruction.

In a vectorized processing unit, one approach that has been employed to perform multiple simultaneous table lookups is through the use of the "permute" instruction. This instruction operates to fill a register with data values from two other registers. The data values can be specified in any order. Referring to FIG. 3, a permute mask is stored in a register 26, and values that are to be used to form the final result are stored in two data registers 28 and 30. The permute instruction uses the mask values in the register 26 to assign corresponding values of the operands in the registers 28 and 30 to a result register 32. In the illustrated example, byte(1) of register 28 is mapped to byte(0) of the result register, and byte(14) of register 30 is mapped to byte(1) of the result register. In this example, each of the registers stores 16 bytes, i.e. 128 bits. The permute instruction therefore enables any one of 32 source bytes, i.e. the 16 bytes of the vectors stored in each of the two registers 28 and 30, to be mapped to any location within the destination vector stored in the register 32.

Figure 4:
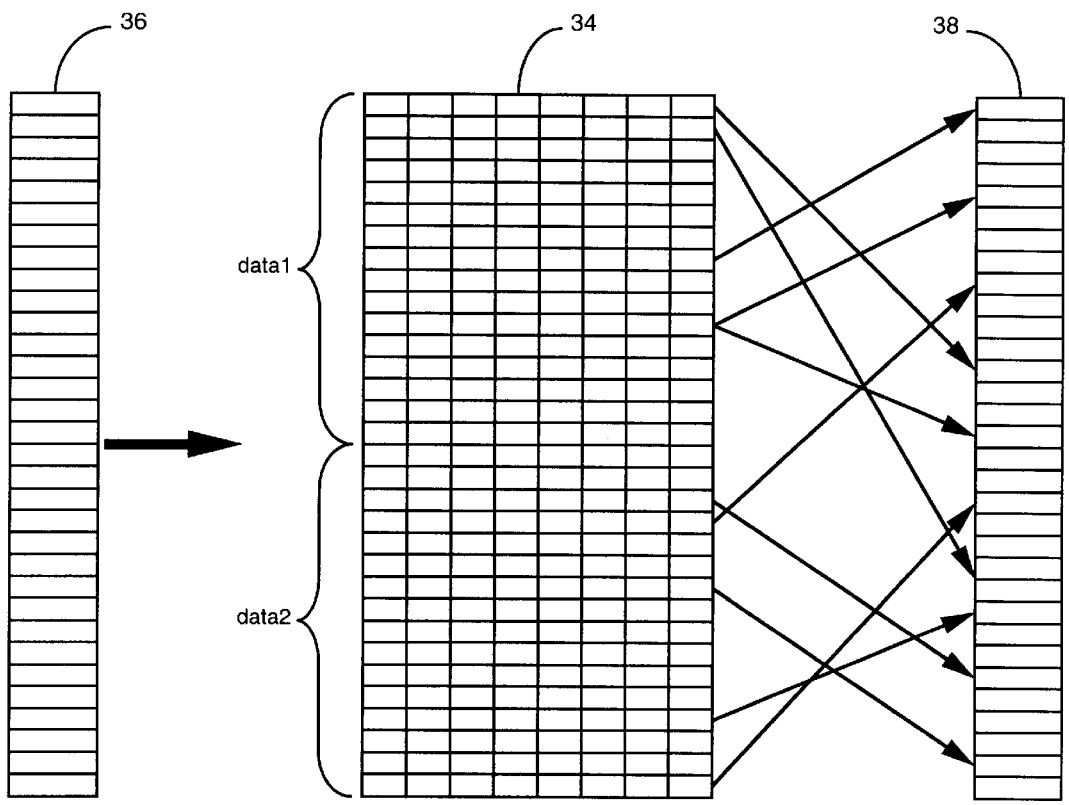
FIG. 4 is a block diagram illustrating use of the permute instruction for multiple simultaneous table lookup operations.

For table lookup operations, the permute instruction can be used to perform 16 simultaneous lookup operations on a 32-byte entry table. FIG. 4 illustrates such a table 34, which consists of two 16-byte vectors, data1 and data2. Each vector can be stored in one register of the CPU. The permute instruction can be used to simultaneously read 16 values from these two vectors, in accordance with index values in a register 36, and store the 16 output results in sequential order in another register 38.

Since the permute instruction selects bytes from two registers which each have a maximum length of 128 bits, or 16 bytes, it is capable of selecting from among 32 different bytes, or entries in the table. Each of these 32 different entries can be uniquely identified with five bits of each byte in the index register 36. Consequently, the three most significant bits of each byte in this register are unused when the permute instruction is employed for table lookups, as described above. In accordance with the present invention, these three unused bits are employed to expand the size of a table which can be indexed by means of the permute instruction. This result is accomplished through the use of a "select" instruction in combination with multiple permute operations.

Figure 5:
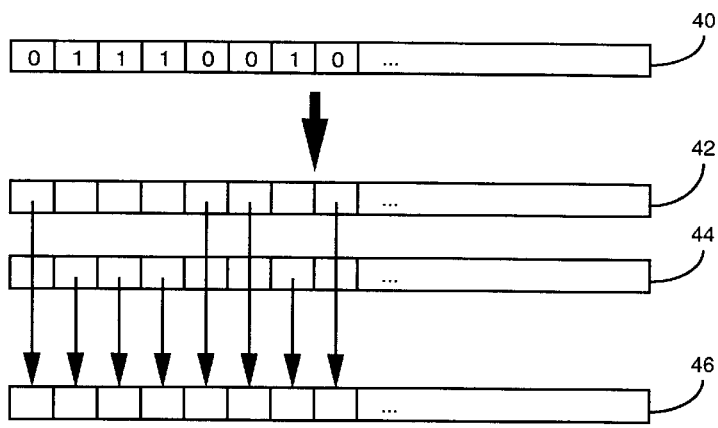
FIG. 5 is a functional representation of the select instruction.

Referring to FIG. 5, the select instruction is a bit-oriented instruction which sets each of the individual values in a result register 46 to be equal to the value in one or the other of two source registers 42 or 44, in accordance with a bit mask stored in a register 40. In the example of FIG. 5, the first bit of the mask register 40 is set at zero, so the first bit of the result register 46 is obtained from data register 42. The next three bits of the mask are set to 1, so the next three bits of the result register 46 are obtained from the values in the corresponding positions of the register 44. This procedure is carried out for each of the bit positions in the result register 46.

In accordance with the invention, multiple simultaneous lookups are carried out on a table that contains more than two registers of data, by performing permute operations on separate portions of the table, in combination with one or more select operations. The unused sixth, seventh and eighth bits in a byte of the index register 36 are used to generate masks for select instructions, to determine which of the results from two or more permute operations on separate parts of the table are to be employed as the final result.

Figure 6:
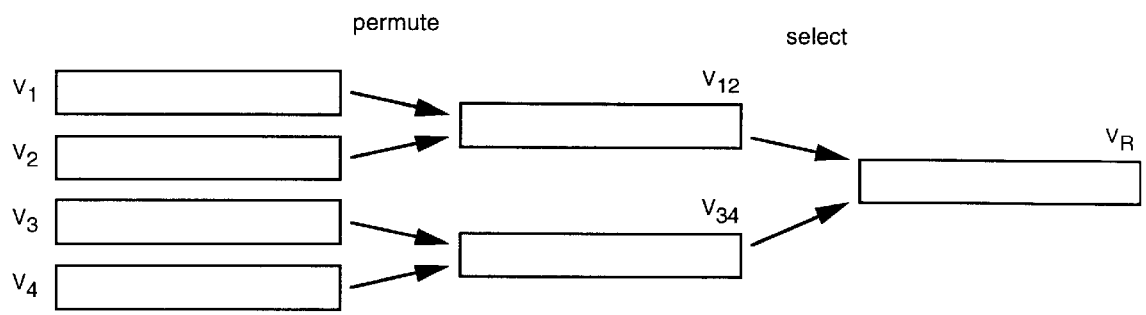
FIG. 6 is a schematic representation of an embodiment in which two permute operations are used in conjunction with one select operation for a table lookup.
Figure 7A:
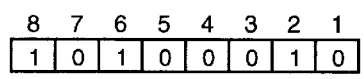
FIGS. 7a, 7b, and 7c illustrate the steps of a logical shift left for a byte.
Figure 7B:
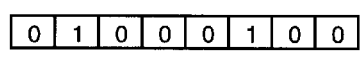
Figure 7C:
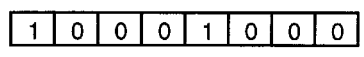

Referring to FIG. 6, a 64-byte entry table can be considered to comprise four 16-byte data vectors $V_1$–$V_4$. The same permute operation is carried out two times with respect to different sets of data represented by these four vectors. One permute operation selects data values from one set of data comprising vectors $V_1$ and $V_2$ in accordance with an index, or permute mask, and stores them in a result register $V_{12}$. The same permute mask is employed for another set of table data comprising vectors $V_3$ and $V_4$, and its results are stored in a second register $V_{34}$. Since the same index is employed for each of the two permute operations, some of the values stored in each of the two registers $V_{12}$ and $V_{34}$ will be correct, and some of them will be improper. The sixth bit of each byte in the index register is employed to identify whether the correct choice is in register $V_{12}$ or register $V_{34}$. This is accomplished by first shifting the bits of each byte in the index to the left by two positions. FIGS. 7a–7c illustrate an example of such shifts for one byte, in which the original value of the sixth bit is equal to 1. Each time the bits are shifted one place to the left, as represented in FIGS. 7b and 7c, the least significant bit is set equal to zero.

After two shifts, the original value of the sixth bit occupies the most significant position in the byte. This bit value is then propagated throughout all of the other bit positions of the byte. One manner in which this can be done is to perform an arithmetic shift to the right seven times, as illustrated in FIGS. 8a–8h. Each time such a shift is performed, bits 2–8 of the byte are shifted one place to the right, and the eighth bit is kept at the value it had before the shift. Hence, in the example of FIG. 8, the value 1 at the eighth bit position is propagated throughout the byte.

This procedure is carried out for each byte in the index register, to thereby form a mask which can be used to select between the value stored in register $V_{12}$ or register $V_{34}$. An example of such a mask is depicted in FIG. 9. As can be seen, each byte of the mask consists of all ones or all zeroes, to selectively indicate which of the bits in $V_{12}$ and $V_{34}$ should be chosen for the final result. In this example, the final results, which are stored in a register $V_R$, consist of the first and second bytes from register $V_{12}$, the third byte from register $V_{34}$, the fourth byte from register $V_2$, etc.

Figure 10:
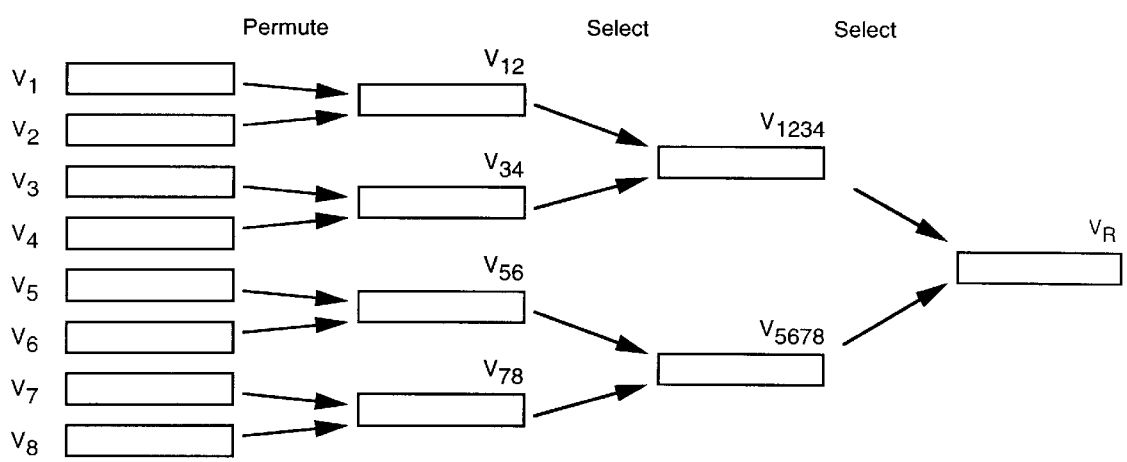
FIG. 10 illustrates an embodiment in which four permute operations are combined with two select operations for a table lookup.

Thus, by employing one of the unused bits of each byte in the index register to generate a selection mask, a permute operation can be employed to perform multiple simultaneous lookups into a table containing more than 32 entries. It will be appreciated that this technique can be expanded to larger tables, through the use of the seventh and eighth bits of each index byte to generate additional masks. Such a situation is illustrated in FIG. 10 for the case of a 128-byte entry table, represented by eight 16-byte data vectors $V_1$–$V_8$. As a first step, a permute operation is carried out for each of the sets of data represented by vector pairs $V_1$ and $V_2$, $V_3$ and $V_4$, $V_5$ and $V_6$, and $V_7$ and $V_8$, respectively. The results of these four permute operations are stored in four registers $V_{12}$–$V_{78}$. The sixth bit of each index byte is then employed to form a selection mask. The selections between $V_{12}$ and $V_{34}$ are stored in a register $V_{1234}$, and the same mask is used to select between $V_{56}$ and $V_{78}$, to store the results in register $V_{5678}$. The seventh bit of the index bytes is then employed in a similar manner, to generate a second selection mask. In this case, however, the seventh bit of the index byte is only shifted to the left one time, and then propagated to the right to form the mask. This mask is used to select between $V_{1234}$ and $V_{5678}$, to store the final results in a register $V_R$. In a similar manner, the eighth bit of each index byte can be employed in a further selection process, to perform a simultaneous read operation on a 256-byte entry table.

From the foregoing, therefore, it can be seen that the present invention expands the capabilities of the permute instruction within a vectorized processing unit, to permit multiple simultaneous lookup operations to be performed with respect to tables containing significantly more than two registers worth of entries. In essence, the table is logically divided into two or more 2-vector tables, to which the permute instruction is applied in its normal manner. The unused bits of each index byte are then employed to generate selection masks that determine which of the results from the logically divided tables are to be employed for the final result.

In the embodiments of the invention discussed thus far, when the permute instruction is used to perform a table lookup, each entry that is retrieved from the table consists of one byte of data. Referring to FIG. 3, each byte in the permute mask 26 designates one byte in either of the two registers 28 and 30 which is to be copied to a corresponding byte position in the result register 32. Thus, the lookup table is comprised of single-byte entries. In some cases, however, it is desirable to employ tables whose entries consist of multiple bytes. For instance, in the example described in connection with FIG. 1, an 8-bit index is used to retrieve a 32-bit entry from the color lookup table. When used in the conventional manner, a single byte in the permute index does not accommodate the retrieval of multiple bytes from the lookup table. In accordance with a further feature of the invention, however, the bytes in the permute mask are expanded to generate multiple consecutive indices that can then be used to retrieve multi-byte entries from a table.

Figure 11:
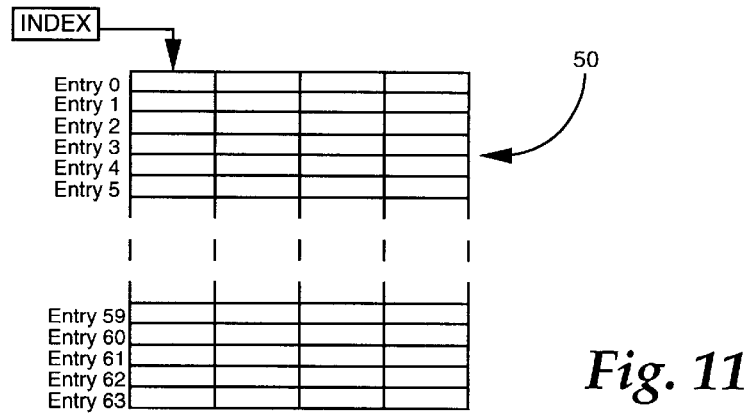
FIG. 11 is a block diagram of a lookup table which contains multi-byte entries.

FIG. 11 illustrates an example of a table 50 which contains 64 4-byte entries. Typically, an index to this table identifies the address of a word, and the lookup operation retrieves four consecutive bytes, which correspond to the word. In a vectorized context, however, an index vector is interpreted with respect to individual bytes in the table, rather than whole words. If the permute instruction is employed to perform the table lookup, only one byte of each entry would be retrieved, thereby returning incomplete data. To alleviate this situation, in the present invention the index values are first processed to convert word addresses into multiple consecutive byte addresses, which can then be used to retrieve the successive bytes of a table entry.

Figure 12:
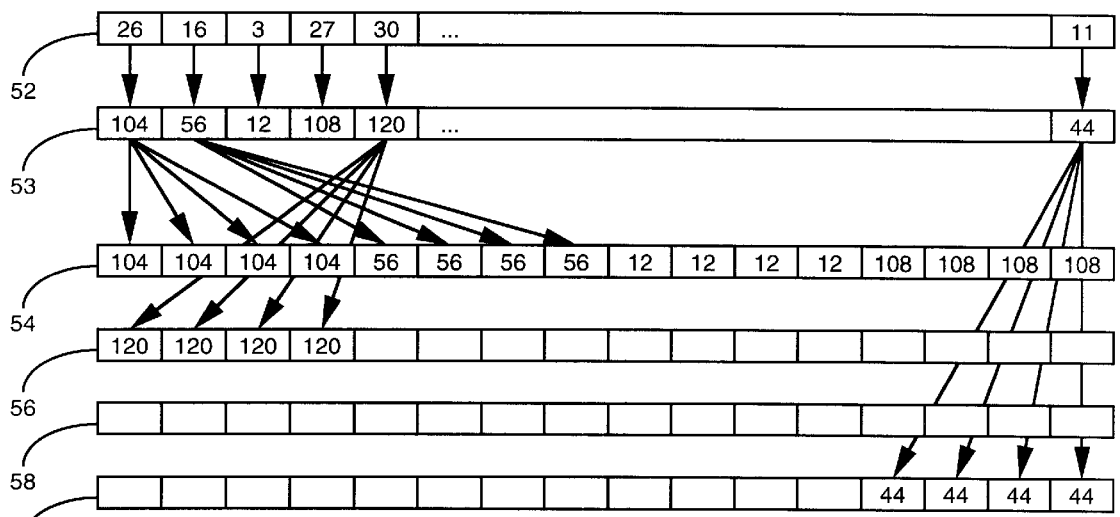
FIG. 12 is a block diagram illustrating the replication of an original index register to form multiple addresses for each index.

FIG. 12 illustrates an example of an index vector 52 which might be employed to retrieve data from the table 50. To utilize such a vector for the retrieval of 4-byte data, each byte in the index is expanded into four bytes. To ensure uniqueness of the index bytes after expansion, each value is first multiplied by 4, and stored in an interim register 53. The expansion then proceeds by copying the first byte in the interim register four times into a register 54. In a similar manner, the second, third and fourth bytes of the interim register are each copied four times into the register 54, to fill that register. The fifth, sixth, seventh and eighth bytes of the interim register 53 are each copied four times into a second register 56, and this procedure is continued until four registers 54–60 are filled with four copies of each of the multiplied bytes from the index register 52.

Figure 13:
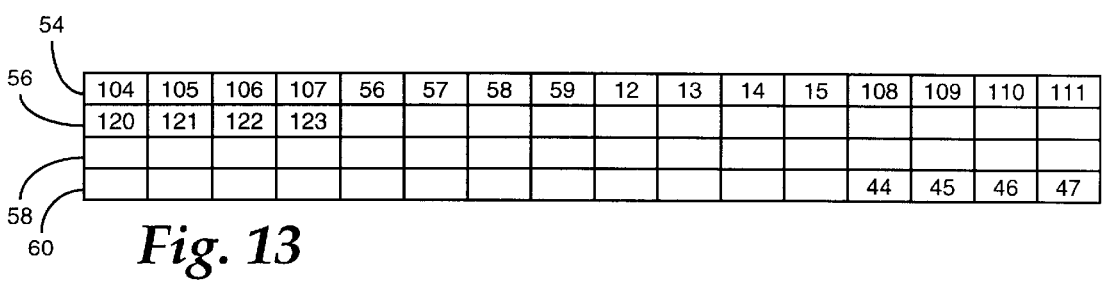
FIG. 13 is a block diagram illustrating the result of an addition operation, to form consecutive addresses.

An addition operation is then carried out to cause the four copies of a byte to identify consecutive addresses. This is accomplished by adding the values 0, 1, 2 and 3 to the four copies of the byte, respectively. The result of this operation is illustrated in FIG. 13. Each of the four registers 54–60 is then employed as a mask for a permute operation, to retrieve four consecutive bytes from the table 50 for each index value in the original index vector 52. If the table consists of 32 entries X 4 bytes, four permute operations are carried out, using the four masks in the registers 54–60, to retrieve four registers of data. If the table contains more than 32 entries, multiple permute operations are carried out for the values in each of the registers 54–60, together with select operations, as described previously, to obtain the final result.

In the foregoing example, a full 4-byte word, i.e., 32 bits, is retrieved from the table for each original index value. If the table consists of only half-word entries, comprising two bytes each, a similar procedure can be employed. In this case, however, each of the index values is multiplied by two and duplicated twice, and the values 0 and 1 are added to the copies, to form two consecutive addresses for each original index value. The result of this operation returns two registers of data, constituting sixteen 2-byte values.

While exemplary embodiments of the invention have been described above in connection with a vectorized processing architecture that employs 128-bit registers, it will be appreciated that the principles of the invention are not limited to this particular embodiment. Rather, the generation and use of a select mask in combination with the permute instruction can be applied in any architecture in which it is desirable to perform multiple simultaneous lookup operations on tables which are larger than the size inherently supported by the length of the data register that stores the permute mask.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to embraced therein.

What is claimed is:

1. A method for performing a lookup operation for a table stored in a computer memory, comprising the steps of:
   storing an index vector containing multiple index values which respectively designate locations in the table;
   performing a plurality of permute operations on different respective sets of data within said table, in accordance with the values in said index vector, to produce a plurality of intermediate result vectors; and
   performing at least one select operation on said intermediate result vectors to produce a final result vector of entries from said data table.

2. The method of claim 1 wherein each permute operation is performed on a pair of vectors containing data within said table, and said plurality of permute operations are respectively performed on different pairs of table data vectors.

3. The method of claim 1 wherein each index value contains a predetermined number of data bits, and said permute operations are performed in accordance with some of the data bits in each index value, and wherein said select operation is carried out in accordance with at least one other data bit of each index value.

4. The method of claim 3 wherein the step of performing a select operation comprises the steps of generating a selection mask from said other data bit in each index value, and selectively choosing data values from different intermediate result vectors in accordance with said mask, to produce said final result vector.

5. The method of claim 4 wherein the step of generating a selection mask includes the steps of replicating said other bit throughout said predetermined number of bits, for each index value.

6. The method of claim 5 wherein said replicating step comprises shifting said other bit to a most significant position within said predetermined number of bits, and propagating the value of the most significant bit throughout said predetermined number of bits.

7. The method of claim 6 wherein said propagating step is carried out by means of arithmetic shift operations.

8. The method of claim 3 wherein said predetermined number of bits is one byte.

9. The method of claim 1 further including the steps of:
   duplicating the original index values in said index vector to produce plural index vectors containing multiple copies of each original index value;
   adding consecutive values to the respective copies of the index values to produce consecutive index values in said plural index vectors; and
   performing permute operations in accordance with each of said plural index vectors to retrieve data at consecutive locations within said table.

10. A method for performing a lookup operation for a table stored in a computer memory, comprising the steps of:
    storing an index vector containing multiple original index values which respectively designate locations in the table;
    duplicating the original index values in said index vector to produce multiple copies of each original index value;
    adding consecutive values to the respective copies of the index values to produce consecutive index values; and
    performing permute operations in accordance with each of said consecutive index values to retrieve data at consecutive locations within said table.

11. The method of claim 10 wherein each original index value comprises one byte of data, and said index values are duplicated to produce two copies of each index value, to thereby retrieve two consecutive bytes of data from said table for each original index value.

12. The method of claim 10 wherein each original index value comprises one byte of data, and said index values are duplicated to produce four copies of each index value, to thereby retrieve four consecutive bytes of data from said table for each original index value.

13. A computer-readable medium containing a program which executes the steps of:
    performing a plurality of permute operations on different respective sets of data within a data table, in accordance with values in an index vector containing multiple index values which respectively designate locations in the table, to produce a plurality of intermediate result vectors; and
    performing at least one select operation on said intermediate result vectors to produce a final result vector containing entries from said data table.

14. The computer-readable medium of claim 13 wherein each permute operation is performed on a pair of vectors containing data within said table, and said plurality of permute operations are respectively performed on different pairs of table data vectors.

15. The computer-readable medium of claim 13 wherein the step of performing a select operation comprises the steps of generating a selection mask from at least one data bit in each index value, and selectively choosing data values from different intermediate result vectors in accordance with said mask, to produce said final result vector.

16. The computer-readable medium of claim 15 wherein the step of generating a selection mask includes the steps of replicating said other bit throughout a predetermined number of bits, for each index value.

17. A method for performing a lookup operation in a table stored in a computer memory, comprising the steps of:

storing an index vector containing multiple index values which respectively designate locations in the table;

performing a plurality of permute operations on different respective sets of data within said table, in accordance with the values in said index vector, to produce a plurality of intermediate result vectors;

generating a selection mask from at least one data bit in each index value, and performing at least one select operation on said intermediate result vectors in accordance with said selection mask, to produce a final result vector of entries from said table.

18. The method of claim 17 wherein each permute operation is performed on a pair of vectors containing data within said table, and said plurality of permute operations are respectively performed on different pairs of table data vectors.

19. The method of claim 17 wherein each index value contains a predetermined number of data bits, and said permute operations are performed in accordance with some of the data bits in each index value, and said selection mask is generated from at least one other data bit of each index value.

20. The method of claim 17 wherein the step of generating a selection mask includes the steps of replicating said one data bit throughout a predetermined number of bits, for each index value.

21. The method of claim 20 wherein said replicating step comprises shifting said one data bit to a most significant position within said predetermined number of bits, and propagating the value of the most significant bit throughout said predetermined number of bits.

22. The method of claim 20 wherein said predetermined number of bits is equal to one byte.

23. A computer-readable medium containing a program which executes the steps of:

duplicating index values in an index vector containing multiple original index values which respectively designate locations in a data table, to produce multiple copies of each original index value;

adding consecutive values to the respective copies of the index values to produce consecutive index values; and performing permute operations in accordance with each of said consecutive index values to retrieve data at consecutive locations within said table.

24. The computer-readable medium of claim 23 wherein each original index value comprises one byte of data, and said index values are duplicated to produce two copies of each index value, to thereby retrieve two consecutive bytes of data from said table for each original index value.

25. The computer-readable method of claim 23 wherein each original index value comprises one byte of data, and said index values are duplicated to produce four copies of each index value, to thereby retrieve four consecutive bytes of data from said table for each original index value.

26. A computer system, comprising:

a memory which stores a table of data values;

a first register which stores a vector of index values that respectively designate locations in a table stored in said memory; and a vector processing unit which performs plural permute operations on different respective sets of data stored in said memory, in accordance with the index values stored in said first register, to load values from said memory into a plurality of intermediate result registers; processes at least one data bit of each index value in said first register to generate a mask; and performs a select operation on the values in said intermediate result registers in accordance with said mask to selectively load data values from a stored table into a final result register.

27. The computer system of claim 26 wherein said processing unit performs said permute operations in accordance with some of the data bits in each index value, and generates said mask in accordance with at least one other data bit of each index value.

28. The computer system of claim 27 wherein said processing unit generates said mask by replicating said other bit throughout a predetermined number of bits, for each index value.

29. The computer system of claim 28 wherein said processing unit shifts said other bit to a most significant position within said predetermined number of bits, and propagates the value of the most significant bit throughout said predetermined number of bits.

30. The computer system of claim 28 wherein said predetermined number of bits is one byte.

31. The computer system of claim 26 wherein said processing unit duplicates the index values in said first register to produce multiple copies of each original index value, adds consecutive values to the respective copies of the index values to produce consecutive index values, and performs a permute operation in accordance with each of said plural index vectors to retrieve data at consecutive locations within said table.

* * * * *